(12) United States Patent
Liao

(10) Patent No.: US 8,929,061 B2
(45) Date of Patent: Jan. 6, 2015

(54) KEYBOARD LIFT MECHANISM FOR LIFTING AND DESCENDING A KEYBOARD AND PORTABLE ELECTRONIC DEVICE USING THE SAME

(75) Inventor: Chien-Jung Liao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 277 days.

(21) Appl. No.: 13/417,334

(22) Filed: Mar. 12, 2012

(65) Prior Publication Data
US 2013/0027851 A1    Jan. 31, 2013

(30) Foreign Application Priority Data
Jul. 29, 2011  (TW) .............................. 100126989 A

(51) Int. Cl.
*H05K 5/02* (2006.01)
*G06F 1/16* (2006.01)
*G06F 3/02* (2006.01)

(52) U.S. Cl.
CPC ................ *G06F 1/1616* (2013.01); *H05K 5/02* (2013.01); *G06F 1/1666* (2013.01); *G06F 3/0221* (2013.01)
USPC ................................. 361/679.08; 361/679.01

(58) Field of Classification Search
CPC ... G06F 1/1601; G06F 1/1613; G06F 1/1633; G06F 1/1681; G06F 3/0208; G06F 3/0216; G06F 3/0219; G06F 1/16; G06F 1/1656; G06F 1/169; G06F 3/0412; G06F 1/1616; G06F 1/1626; G06F 1/1632; G06F 1/1637; G06F 1/1643; G06F 1/1658; G06F 1/1662; G06F 1/1669; G06F 1/1666; G06F 3/0221; H05K 13/0015; H05K 5/02; H05K 7/1488

USPC ............ 361/679.01, 679.02, 679.08, 679.09, 361/679.21, 679.26, 679.27, 724–727, 361/679.55–679.58; 248/917–924
See application file for complete search history.

(56) References Cited

U.S. PATENT DOCUMENTS

| | | | | |
|---|---|---|---|---|
| 5,754,395 A | * | 5/1998 | Hsu et al. | 361/679.11 |
| 6,320,743 B1 | * | 11/2001 | Jin et al. | 361/679.08 |
| 7,187,537 B2 | * | 3/2007 | Liao | 361/679.09 |

FOREIGN PATENT DOCUMENTS

CN       201212962 Y       3/2009

OTHER PUBLICATIONS

Office action mailed on Dec. 10, 2013 for the Taiwan application No. 100126989, filing date: Jul. 29, 2011, p. 2 line 5-26, p. 3-4 and p. 5 line 1-2.

*Primary Examiner* — Anthony Haughton
*Assistant Examiner* — Ingrid Wright
(74) *Attorney, Agent, or Firm* — Winston Hsu; Scott Margo

(57) ABSTRACT

A keyboard lift mechanism includes a sliding block, a link bar, a hinge assembly, a driving member and a resilient member. The sliding block is slidably disposed inside a lower casing. Both ends of the link bar are pivoted to a keyboard and the sliding block, respectively. The driving member is coupled to the hinge assembly. The resilient member abuts against the lower casing and the sliding block. The resilient member and the driving member drive the sliding block to move in a first direction when the upper casing rotates in a first rotating direction, such that the link bar is driven to rotate the keyboard to a containing position, and drive the sliding block to move in a second direction when the upper casing rotates in a second rotating direction, such that the link bar is driven to rotate the keyboard to an opening position.

17 Claims, 15 Drawing Sheets

US 8,929,061 B2

KEYBOARD LIFT MECHANISM FOR LIFTING AND DESCENDING A KEYBOARD AND PORTABLE ELECTRONIC DEVICE USING THE SAME

BACKGROUND OF THE INVENTION

1. Field of the Invention

The present invention relates to a keyboard lift mechanism and a portable electronic device therewith, and more particularly, to a keyboard lift mechanism for lifting and descending a keyboard and a portable electronic device therewith.

2. Description of the Prior Art

Generally speaking, a keyboard of a notebook computer is installed on a host casing with parallel orientation relative to a desk for supporting the notebook computer. However, an angle of the keyboard in use is not adjustable according to a user's preference, so as to fail in providing the user with convenient and ergonomic use of the notebook computer.

SUMMARY OF THE DISCLOSURE

Thus, the present invention provides a keyboard lift mechanism for lifting and descending a keyboard and a portable electronic device therewith for solving above drawbacks.

According to the invention, a keyboard lift mechanism for lifting and descending a keyboard of a portable electronic device is disclosed. The portable electronic device includes an upper casing and a lower casing, and a first side of the keyboard is pivoted to the lower casing. The keyboard lift mechanism includes a sliding block, a link bar, a hinge assembly, a driving member and a resilient member. The sliding block is slidably disposed inside the lower casing, and both ends of the link bar are respectively pivoted to a second side of the keyboard and the sliding block. The hinge assembly is pivoted to the upper casing and the lower casing. The driving member is connected to the hinge assembly. The resilient member abuts against the lower casing and the sliding block. The resilient member and the driving member drive the sliding block to move in a first direction when the upper casing rotates in a first rotating direction, such that the link bar is rotated to drive the keyboard to a containing position, and the resilient member and the driving member drive the sliding block to move in a second direction opposite to the first direction when the upper casing rotates in a second rotating direction opposite to the first direction, such that the link bar is rotated to drive the keyboard to an opening position.

According to the invention, a portable electronic device includes a lower casing, an upper casing, a keyboard and a keyboard lift mechanism. The upper casing is pivoted to the lower casing. The keyboard is disposed on the lower casing, and a first side of the keyboard is pivoted to the lower casing. The keyboard lift mechanism for lifting and descending the keyboard includes a sliding block, a link bar, a hinge assembly, a driving member and a resilient member. The sliding block is slidably disposed inside the lower casing, and both ends of the link bar are respectively pivoted to a second side of the keyboard and the sliding block. The hinge assembly is pivoted to the upper casing and the lower casing. The driving member is connected to the hinge assembly. The resilient member abuts against the lower casing and the sliding block. The resilient member and the driving member drive the sliding block to move in a first direction when the upper casing rotates in a first rotating direction, such that the link bar is rotated to drive the keyboard to a containing position, and the resilient member and the driving member drive the sliding block to move in a second direction opposite to the first direction when the upper casing rotates in a second rotating direction opposite to the first direction, such that the link bar is rotated to drive the keyboard to an opening position.

In summary, the present invention utilizes cooperation of the driving member, the sliding block, the resilient member and the link bar to make the keyboard lift and descend between the containing position and the opening position when the upper casing of the portable electronic device is rotated.

These and other objectives of the present invention will no doubt become obvious to those of ordinary skill in the art after reading the following detailed description of the embodiment that is illustrated in the various figures and drawings.

DETAILED DESCRIPTION

Figure 1:
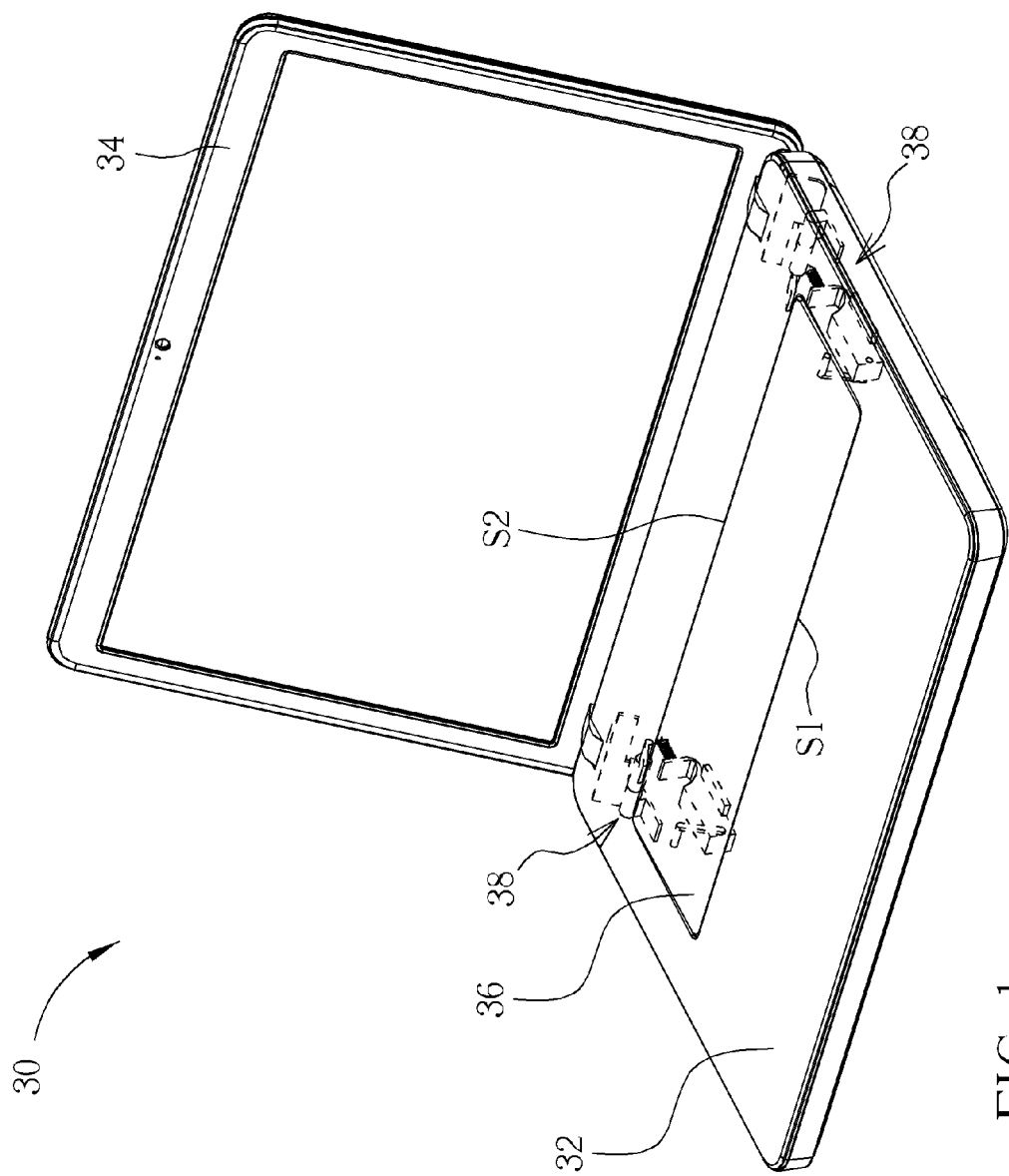
FIG. 1 is a diagram of a portable electronic device according to a first embodiment of the present invention.
Figure 2:
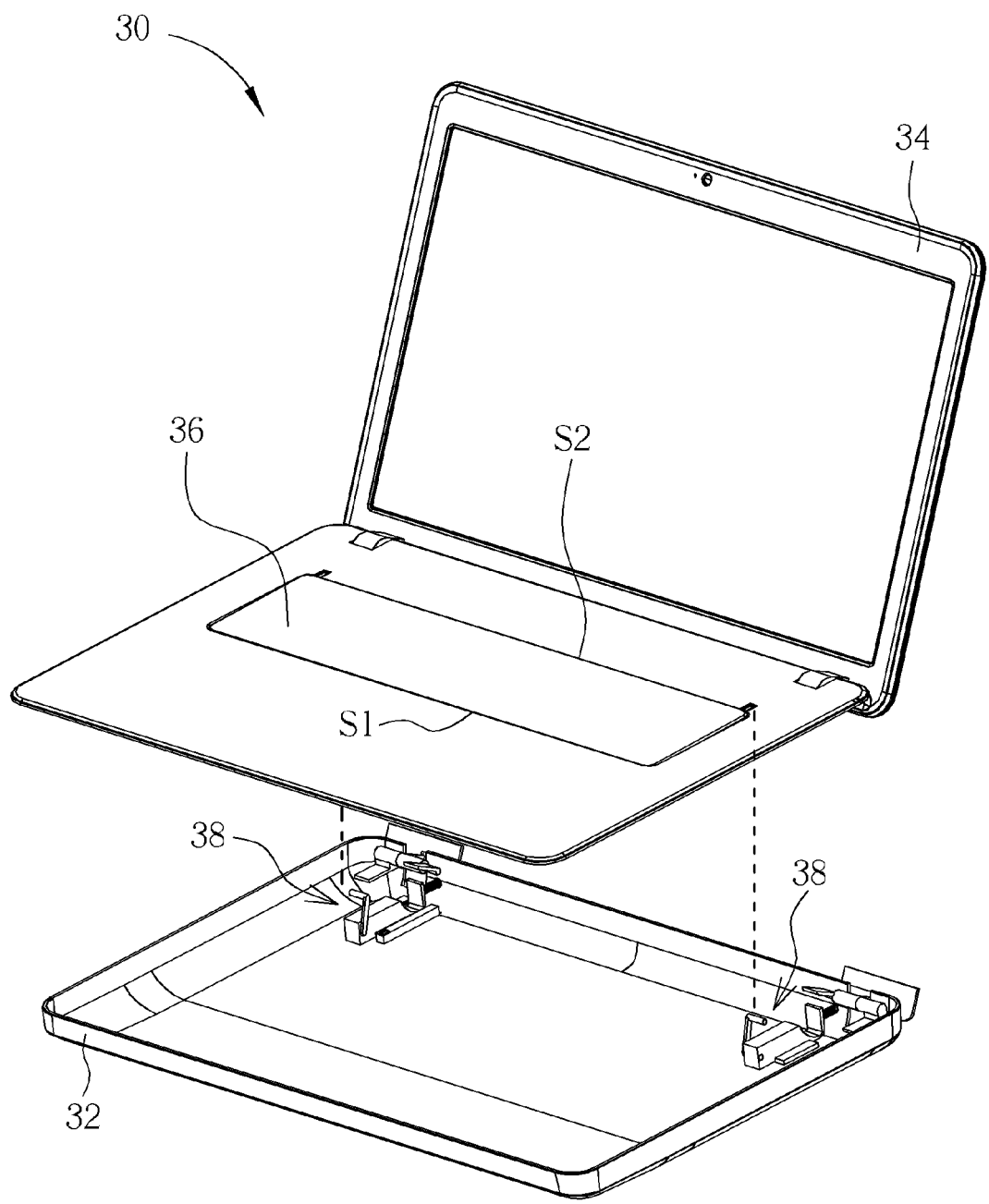
FIG. 2 is an exploded diagram of the portable electronic device according to the first embodiment of the present invention.

Please refer to FIG. 1 and FIG. 2. FIG. 1 is a diagram of a portable electronic device 30 according to a first embodiment of the present invention. FIG. 2 is an exploded diagram of the portable electronic device 30 according to the first embodiment of the present invention. As shown in FIG. 1 and FIG. 2, the portable electronic device 30 includes a lower casing 32, an upper casing 34, a keyboard 36 and at least one keyboard lift mechanism 38. The upper casing 34 is pivoted to the lower casing 32. The keyboard 36 is disposed on the lower casing 32, and a first side S1 of the keyboard 36 is pivoted to the lower casing 32. The keyboard lift mechanism 38 is disposed inside the lower casing 32 of the portable electronic device 30 for lifting and descending a second side S2 opposite to the first side S1 of the keyboard 36. In this embodiment, the portable electronic device 30 includes two keyboard lift mechanisms 38, which are respectively disposed on two lateral sides of the keyboard 36. It should be noticed that an amount and disposal position of the keyboard lift mechanism 38 are not limited to those mentioned in this embodiment, and it depends on practical demands. For example, there can be only one keyboard lift mechanism 38, and it can be disposed in a middle position of the second side S2 of the keyboard 36. As mentioned above, the keyboard 36 can rotate relative to a pivoting axis of the first side S1 of the keyboard 36 and the lower casing 32 when the keyboard lift mechanism 38 lifts and descends the second side S2 of the keyboard 36. In this embodiment, the portable electronic device 30 can be a notebook computer. The upper casing 34 can be utilized for containing a display module equipped with components, such as a panel, a backlight module and so on. The lower casing 32 can be utilized for containing a host module equipped with components, such as a motherboard, a CD-ROM drive, a hardware disc drive and so on.

Figure 3:
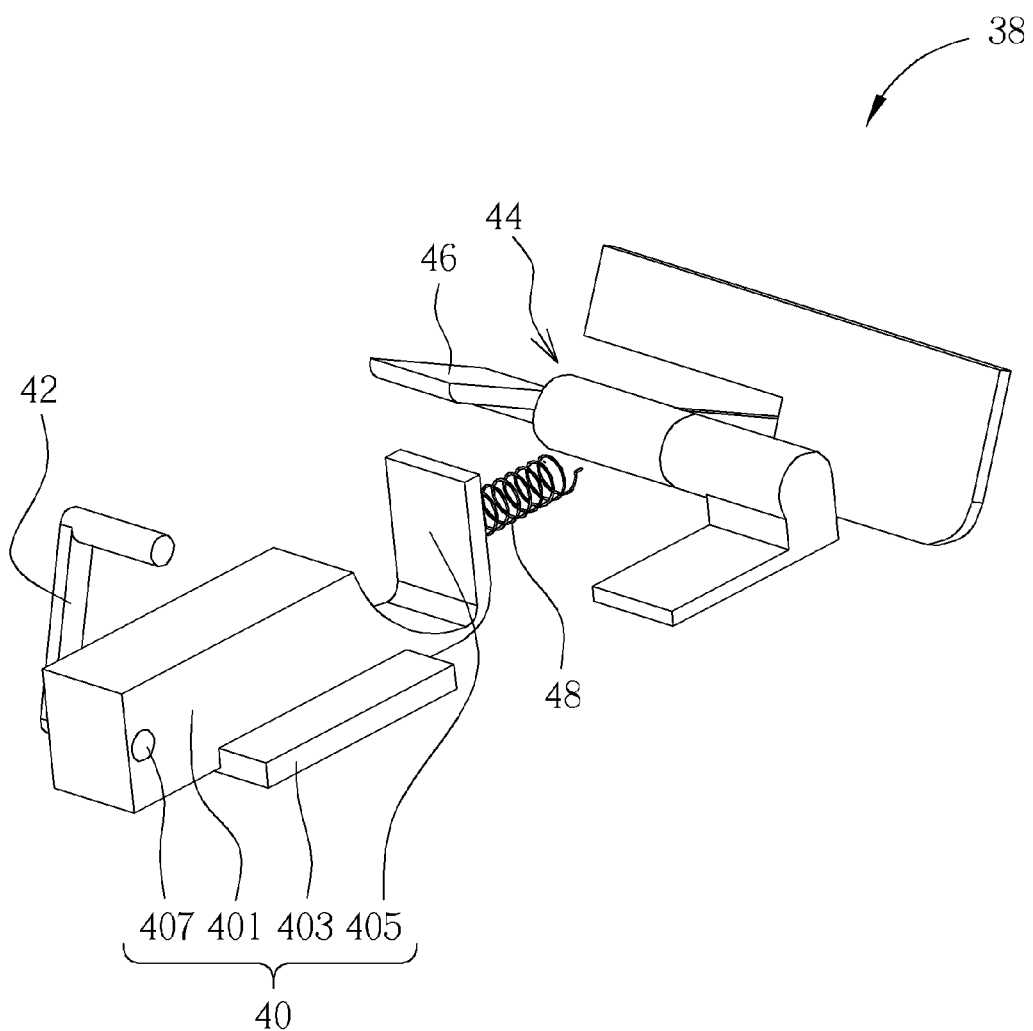
FIG. 3 is a diagram of a keyboard lift mechanism according to the first embodiment of the present invention.
Figure 4:
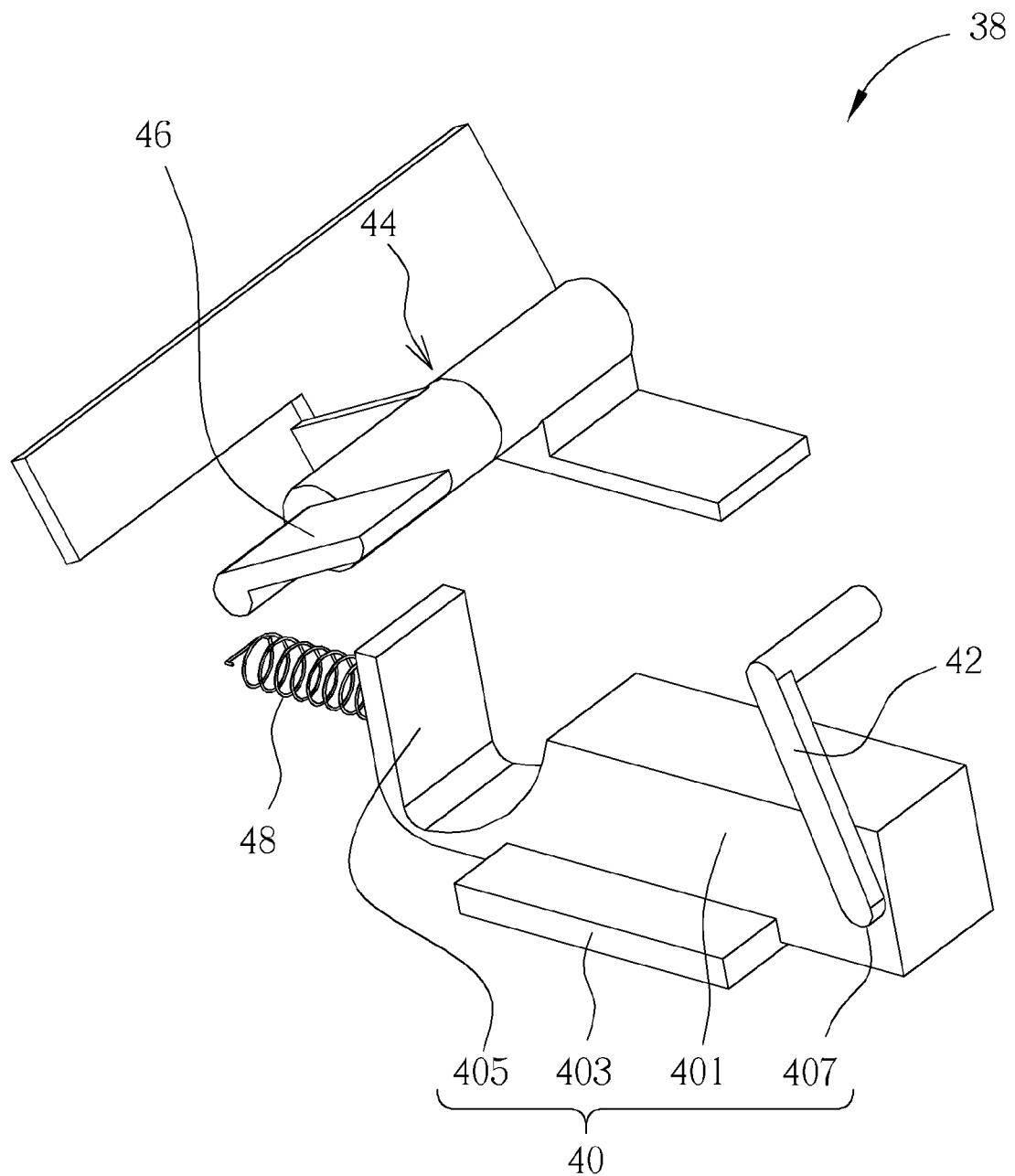
FIG. 4 is a diagram of the keyboard lift mechanism in another view according to the first embodiment of the present invention.
Figure 5:
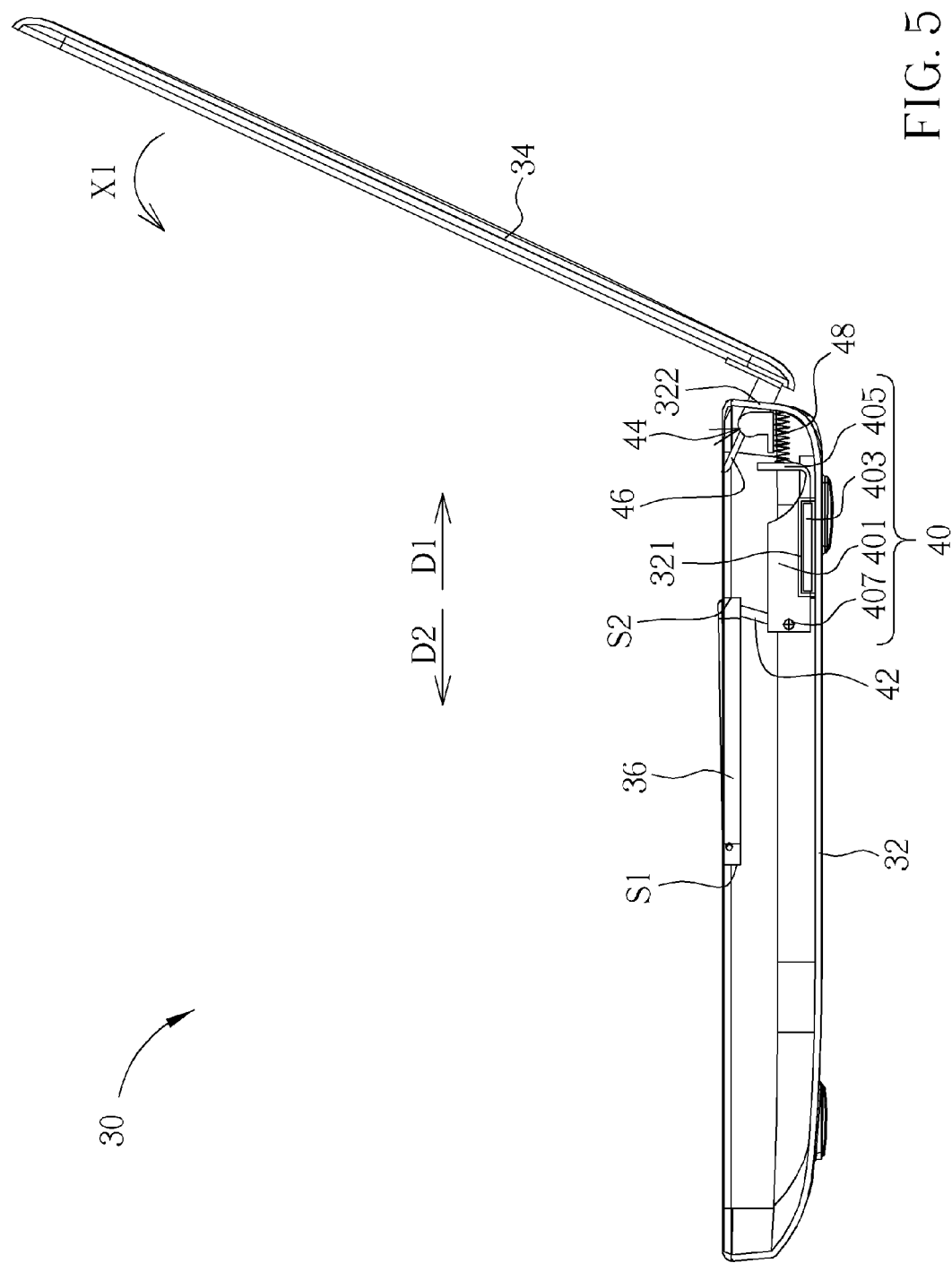
FIG. 5 is a cross-sectional view of the portable electronic device with a keyboard being in an opening status according to the first embodiment of the present invention.

Please refer to FIG. 3 to FIG. 5. FIG. 3 is a diagram of the keyboard lift mechanism 38 according to the first embodiment of the present invention. FIG. 4 is a diagram of the keyboard lift mechanism 38 in another view according to the first embodiment of the present invention. FIG. 5 is a cross-sectional view of the portable electronic device 30 with the keyboard 36 being in an opening status according to the first embodiment of the present invention. As shown in FIG. 3 to FIG. 5, the keyboard lift mechanism 38 includes a sliding block 40, a link bar 42, a hinge assembly 44, a driving member 46 and a resilient member 48. The sliding block 40 is slidably disposed inside the lower casing 32. Both ends of the link bar 42 are respectively pivoted to the second side S2 of the keyboard 36 and the sliding block 40. The hinge assembly 44 is used for pivoting the upper casing 34 and the lower casing 32 of the portable electronic device 30. The driving member 46 is connected to the hinge assembly 44 and capable of rotating with the upper casing 34. In addition, the resilient member 48 abuts against the lower casing 32 of the portable electronic device 30 and the sliding block 40.

Furthermore, the lower casing 32 of the portable electronic device 30 includes a sliding slot 321 which is disposed in a position corresponding to the sliding block 40. In addition, the sliding block 40 includes a sliding body 401, a sliding portion 403, a driving portion 405 and a pivoting portion 407. The sliding portion 403 is connected to a bottom of the sliding body 401 and disposed in the sliding slot 321 of the lower casing 32. Accordingly, the sliding body 401 is slidably inside the lower casing 32. The driving portion 405 is connected to a side of the sliding body 401 corresponding to the driving member 46 and abuts against the resilient member 48. In other words, an end of the resilient member 48 abuts against the driving portion 405, and the other end of the resilient member 48 abuts against an inner wall 322 of the lower casing 32 of the portable electronic device 30. Accordingly, when the sliding body 401 of the sliding block 40 slides relative to the lower casing 32, the driving portion 405 of the sliding block 40 can compress or release the resilient member 48 cooperatively with the inner wall 322 of the lower casing 32, so as to generate a corresponding resilient force of the resilient member 48. In this embodiment, the resilient member 48 can be a spring, such as a compression spring. It should be noticed that structure of the resilient member 48 is not limited to that mentioned in this embodiment. For example, the resilient member 48 can be a torsion spring as well. In other words, structures capable of providing the sliding block 40 with resilient force are within the scope of the present invention.

In addition, the pivoting portion 407 of the sliding block 40 is disposed on another side of the sliding body 401 opposite to the driving portion 405 for pivoting to the link bar 42. As mentioned above, when the sliding portion 403 of the sliding block 40 slides relative to the sliding slot 321 of the lower casing 32, the sliding body 401 can drive the link bar 42 to rotate, so as to drive the keyboard 36 to rotate relative to the pivoting axis of the first side S1 of the keyboard 36 and the lower casing 32. In such a manner, the keyboard lift mechanism 38 of the present invention can drive the second side S2 of the keyboard 36 to lift or descend.

Figure 6:
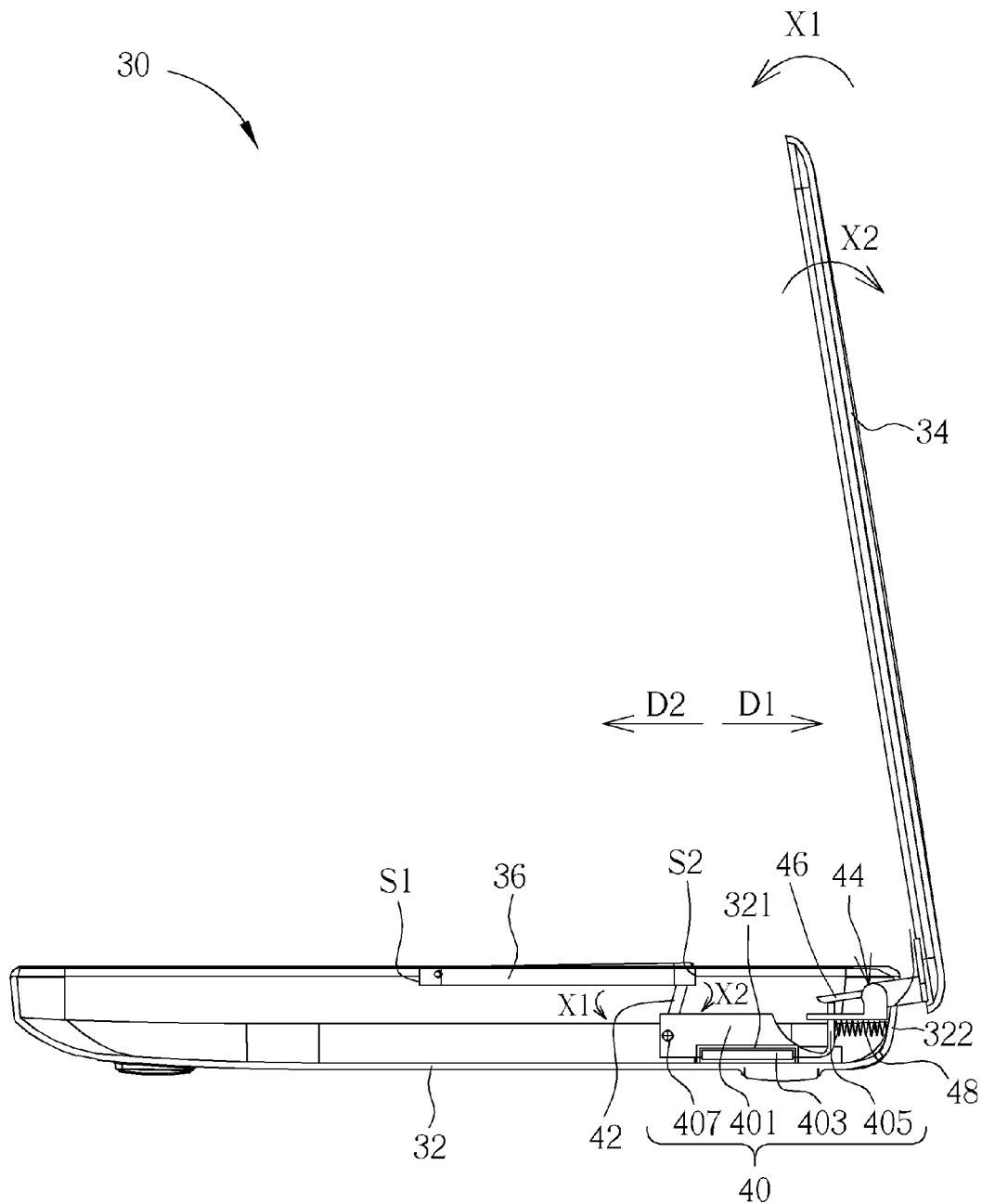
FIG. 6 is a cross-sectional view illustrating that a driving member of the portable electronic device abuts against a driving portion of a sliding block according to the first embodiment of the present invention.
Figure 7:
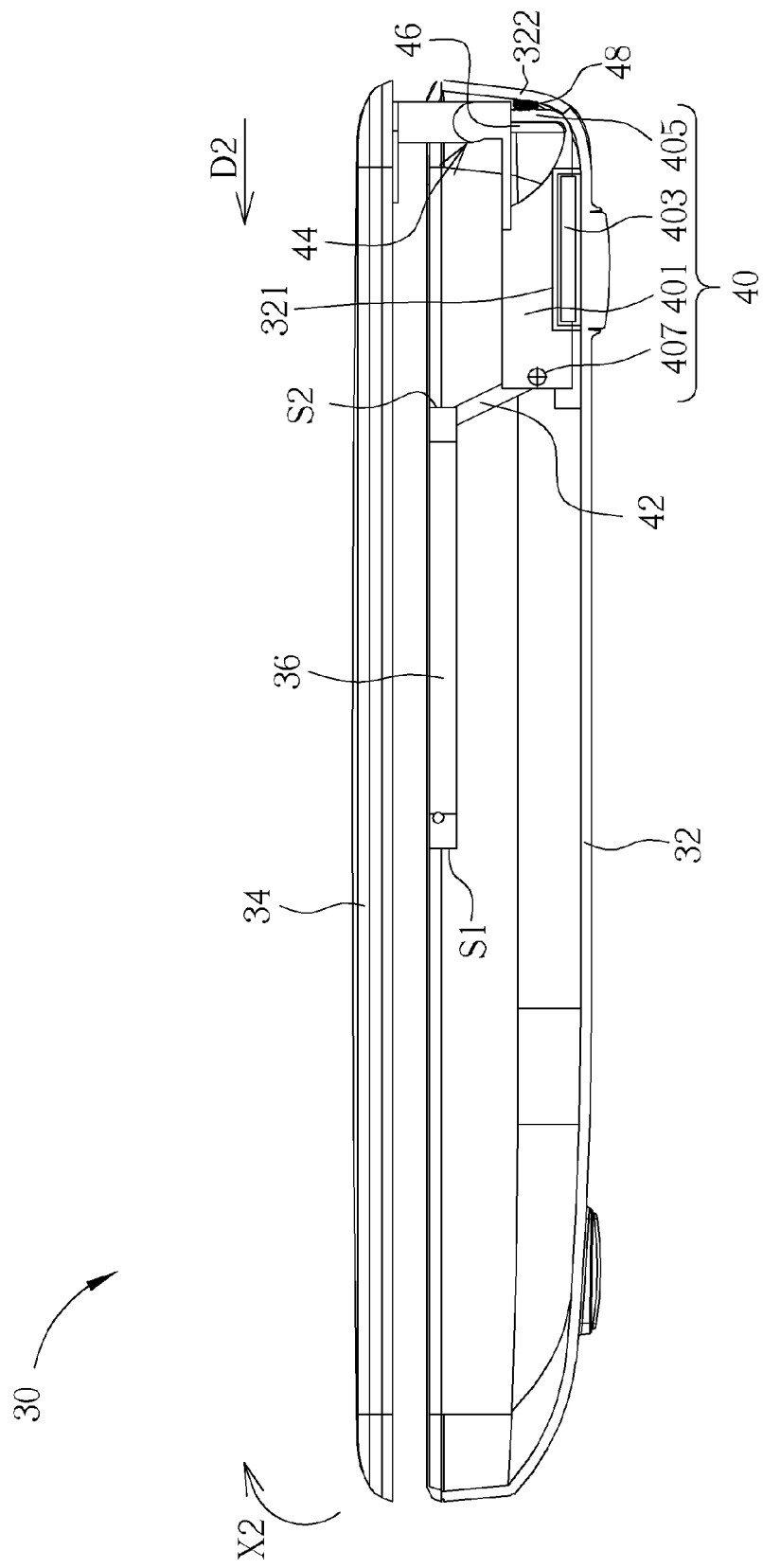
FIG. 7 is a cross-sectional view of the portable electronic device with the keyboard being in a containing status according to the first embodiment of the present invention.

More detailed description for principle of the keyboard lift mechanism 38 according to the first embodiment is provided as follows. Please refer to FIG. 5 to FIG. 7. FIG. 6 is a cross-sectional view illustrating that the driving member 46 of the portable electronic device 30 abuts against the driving portion 405 of the sliding block 40 according to the first embodiment of the present invention. FIG. 7 is a cross-sectional view of the portable electronic device 30 with the keyboard 36 being in a containing status according to the first embodiment of the present invention. As shown in FIG. 5 to FIG. 7, when the portable electronic device 30 is desired to be contained, the upper casing 34 of the portable electronic device 30 is rotated in a first rotating direction X1, i.e. a counterclockwise direction as shown in FIG. 6, from a position shown in FIG. 5 to a position shown in FIG. 6. In the meanwhile, the driving member 46 abuts against the driving portion 405 of the sliding block 40. When the upper casing 34 of the portable electronic device 30 continues rotating in the first rotating direction X1 from the position shown in FIG. 6, the driving member 46 pushes the driving portion 405, so as to drive the sliding body 401 to move in a first direction D1. In such a manner, the pivoting portion 407 of the sliding block 40 can drive the link bar 42 to rotate, so as to drive the keyboard 36 to rotate toward a containing position shown in FIG. 7 until the keyboard 36 is located in the containing position shown in FIG. 7. In the meanwhile, the upper casing 34 of the portable electronic device 30 is closed relative to the lower casing 32 for a user to contain or carry easily. In addition, when the sliding body 401 moves in the first direction D1, the driving portion 405 of the sliding block 40 compresses the resilient member 48 cooperatively with the inner wall 322 of the lower casing 32, such that the resilient member 48 stores a resilient energy during the above-mentioned process.

When the portable electronic device 30 is desired to be opened, the upper casing 34 of the portable electronic device 30 is rotated in a second rotating direction X2 opposite to the first rotating direction X1, i.e. a clockwise direction as shown in FIG. 7, from the position shown in FIG. 7 to the position shown in FIG. 6. The resilient member 48 releases the resilient energy for generating a resilient force, so as to drive the driving portion 405 of the sliding block 40 to continuously abut against the driving member 46 and to drive the sliding body 401 to move in a second direction D2 opposite to the first direction D1. In such a manner, the pivoting portion 407 of the sliding block 40 drives the link bar 42 to rotate, so as to drive the keyboard 36 to rotate toward an opening position shown in FIG. 5. When the upper casing 34 of the portable electronic device 30 continues rotating in the second rotating direction X2 from the position shown in FIG. 6, the driving member 46 separates from the driving portion 405 of the sliding block 40. The resilient member 48 releases rest of the resilient energy for generating the resilient force, so as to drive the sliding body 401 to continue moving in the second direction D2 and to drive the pivoting portion 407 of the sliding block 40 to push the link bar 42, until the keyboard 36 is located in the opening position shown in FIG. 5. In the meanwhile, the upper casing 34 of the portable electronic device 30 is opened relative to the lower casing 32 for the user to operate the keyboard 36 in the opening position.

In this embodiment, when the driving member 46 is rotated with the upper casing 34 from the position shown in FIG. 5 in the first rotating direction X1 to drive the sliding block 40, the sliding block 40 moves in the first direction D1. In the meanwhile, the sliding block 40 can drive the link bar 42 to rotate in the same first rotating direction X1, as shown in FIG. 6, until the keyboard 36 is located in the containing position shown in FIG. 7. On the other hand, when the driving member 46 is rotated with the upper casing 34 from the position shown in FIG. 7 in the second rotating direction X2, the resilient member 48 drives the sliding block 40 to move in the second direction D2. In the meanwhile, the sliding block 40 can drive the link bar 42 to rotate in the same second rotating direction X2, as shown in FIG. 6, until the keyboard 36 is located in the opening position shown in FIG. 5.

Figure 8:
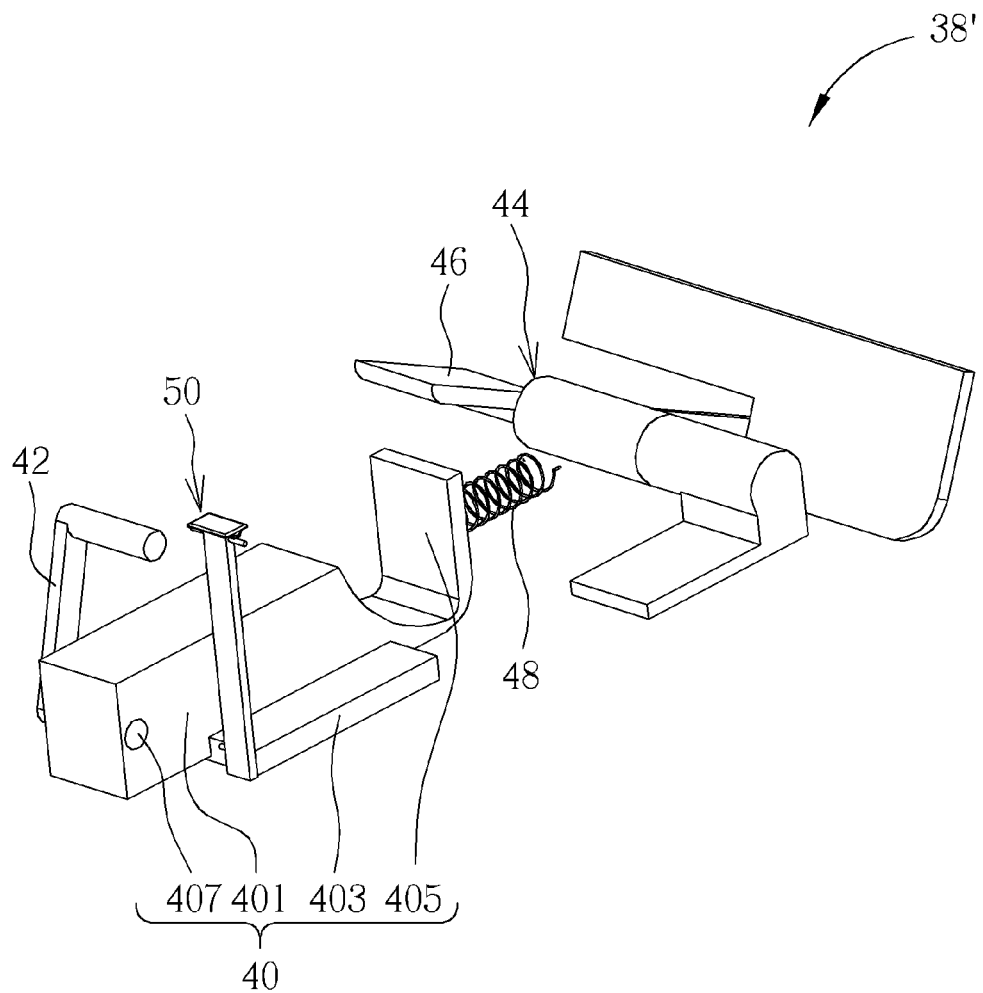
FIG. 8 is a diagram of a keyboard lift mechanism according to a second embodiment of the present invention.
Figure 9:
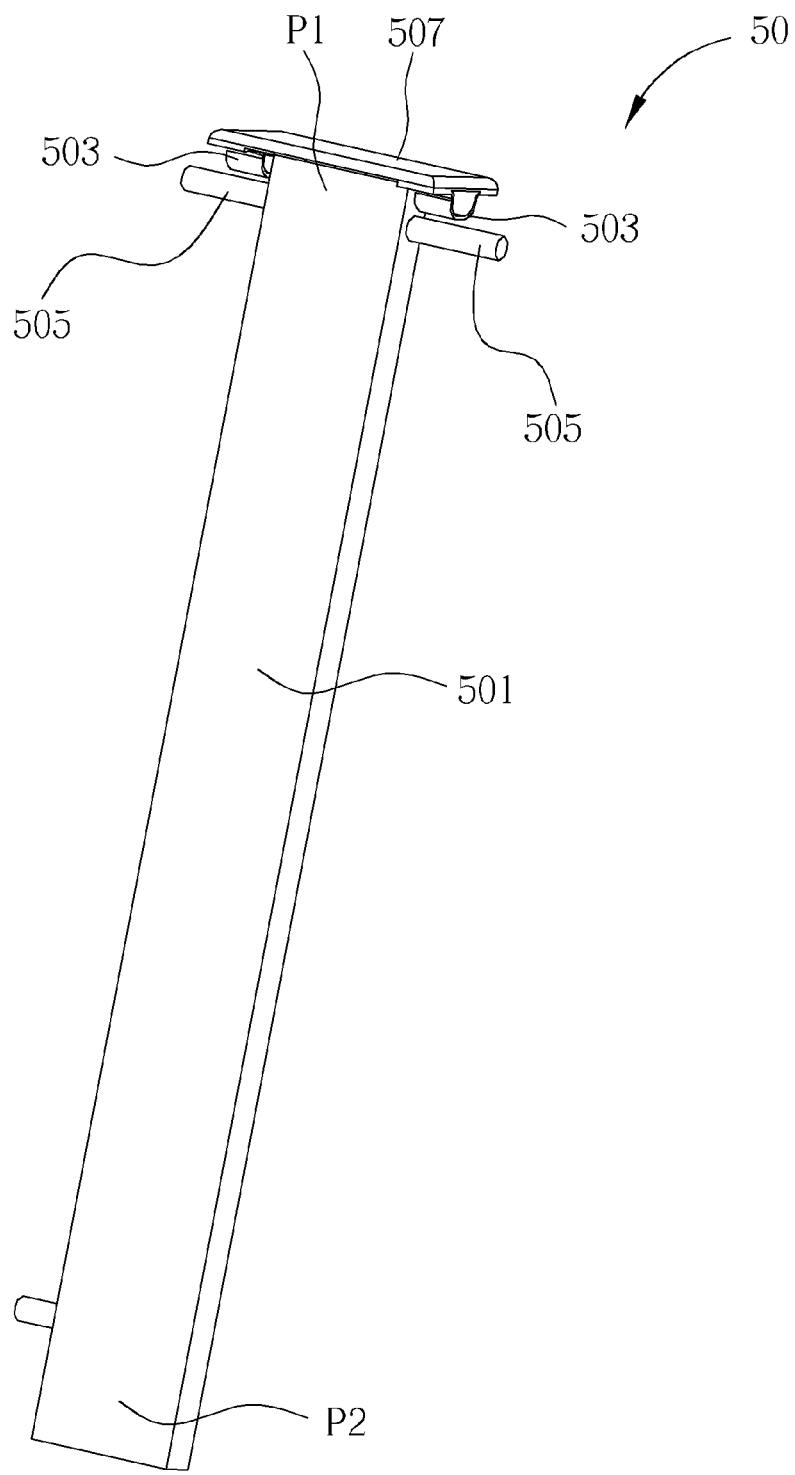
FIG. 9 is a diagram of a constraining member according to the second embodiment of the present invention.
Figure 10:
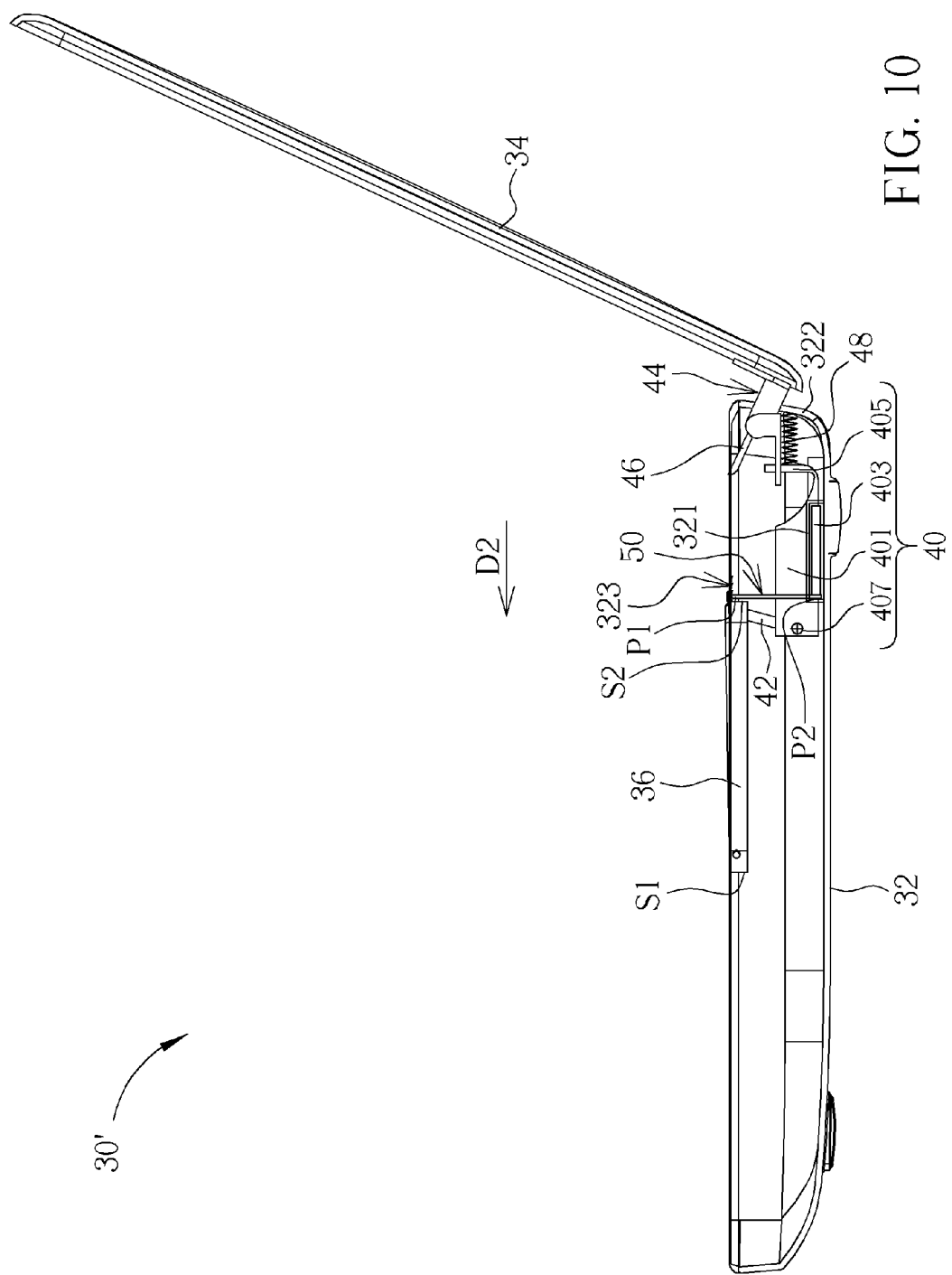
FIG. 10 is a cross-sectional view of the portable electronic device with the sliding block located in a constraining position according to the second embodiment of the present invention.
Figure 11:
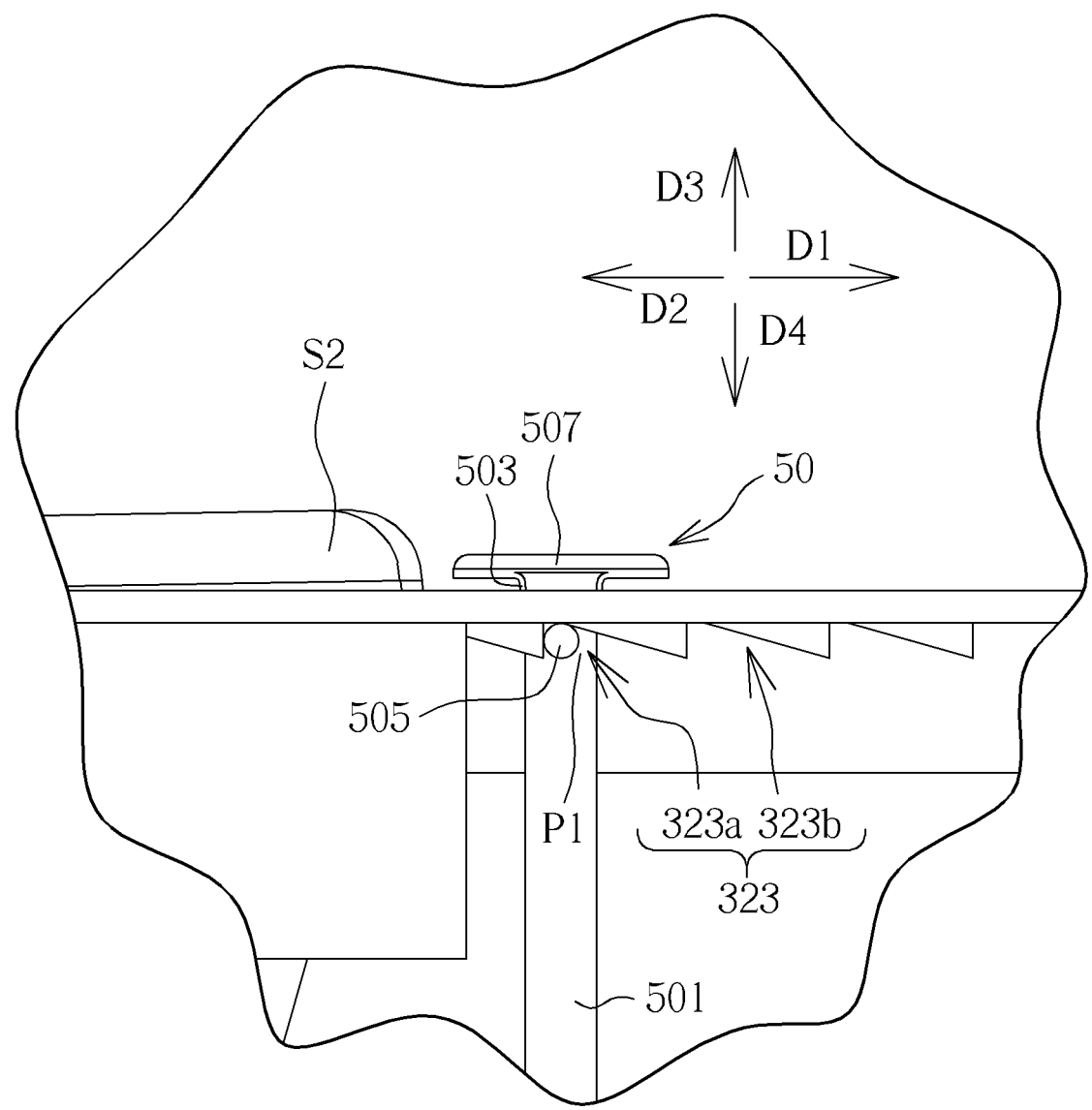
FIG. 11 is a partly enlarged view of the portable electronic device shown in FIG. 10 according to the second embodiment of the present invention.

Please refer to FIG. 8. FIG. 8 is a diagram of a keyboard lift mechanism 38' according to a second embodiment of the present invention. As shown in FIG. 8 and FIG. 3, main difference between the keyboard lift mechanism 38' and the aforesaid keyboard lift mechanism 38 is that the keyboard lift mechanism 38' further includes a constraining member 50. The constraining member 50 is movably disposed inside the lower casing 32 and located on a path which the sliding portion 403 of the sliding block 40 slides along. Please refer to FIG. 9 to FIG. 11 as well as FIG. 8. FIG. 9 is a diagram of the constraining member 50 according to the second embodiment of the present invention. FIG. 10 is a cross-sectional view of the portable electronic device 30' with the sliding block 40 located in a constraining position according to the second embodiment of the present invention. FIG. 11 is a partly enlarged view of the portable electronic device 30' shown in FIG. 10 according to the second embodiment of the present invention. As shown in FIG. 9 to FIG. 11, the constraining member 50 includes a main body 501, a resilient structure 503, an engaging structure 505 and a pressing structure 507. In addition, the lower casing 32 includes a plurality of constraining slots 323. The resilient structure 503 is disposed on the main body 501 and abuts against the lower casing 32. The engaging structure 505 is disposed on the main body 501. The pressing structure 507 is disposed on a first end P1 of the main body 501 and connected to the resilient structure 503. The resilient structure 503 is used for providing a resilient force in a third direction D3, so as to drive the main body 501 to recover in the third direction D3.

When the resilient structure 503 of the constraining member 50 drives the main body 501 to recover in the third direction D3, the engaging structure 505 of the constraining member 50 can engage with the constraining slot 323a of the lower casing 32, as shown in FIG. 11. Accordingly, when the driving member 46 is rotated with the upper casing 34 of the portable electronic device 30' to a position that the driving member 46 separates from the driving portion 405 of the sliding block 40, the sliding body 401 of the sliding block 40 is driven by the resilient member 48 to move in the second direction D2. In the meanwhile, a second end P2 of the main body 501 of the constraining member 50 can stop the sliding body 401 of the sliding block 40 in the constraining position, as shown in FIG. 10. In such a manner, the constraining member 50 can constrain a sliding distance of the sliding block 40, so as to constrain a rotating angle of the link bar 42. Accordingly, a lift height of the second side S2 of the keyboard 36 can be constrained.

Figure 12:
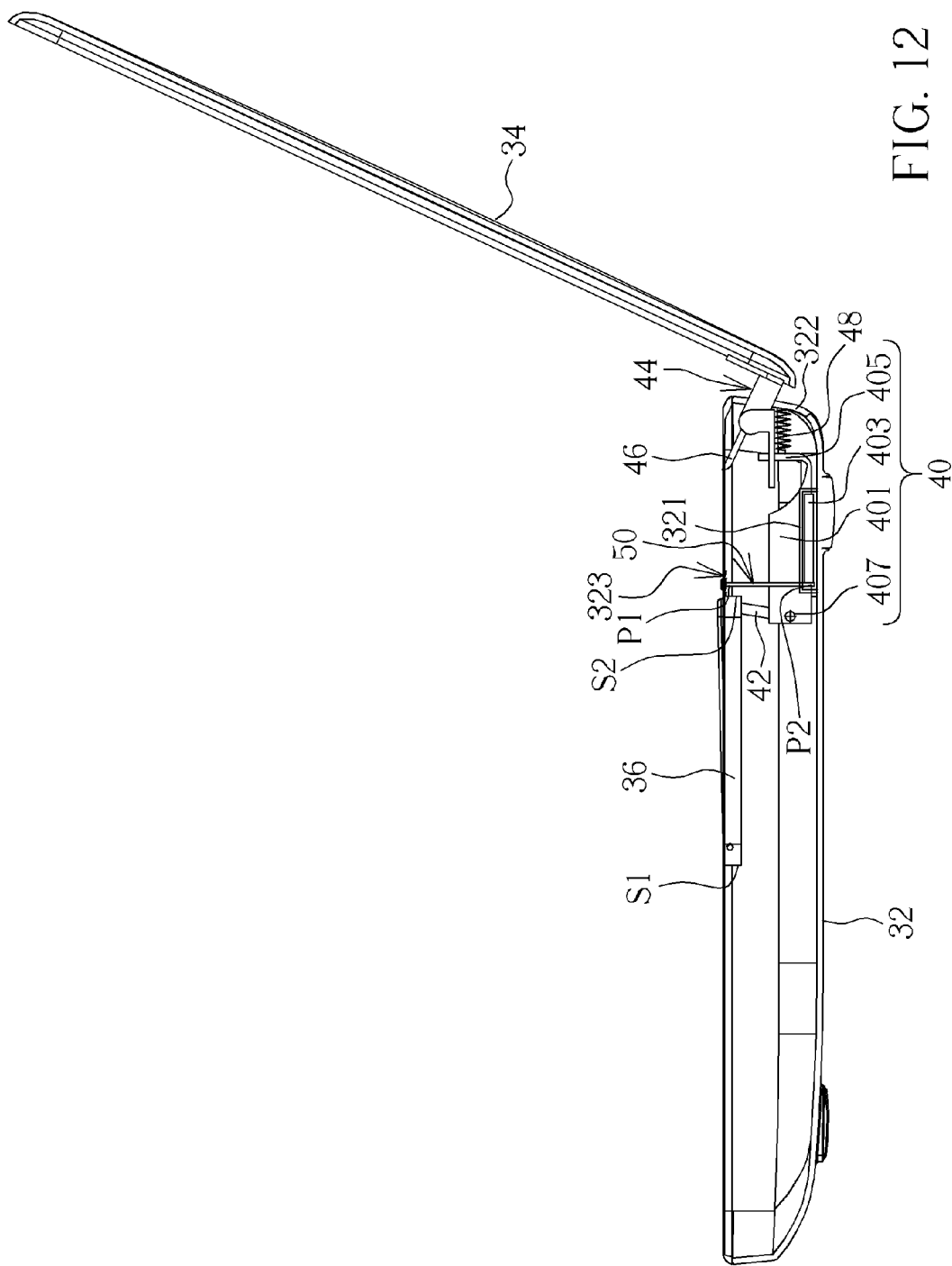
FIG. 12 is a cross-sectional view of the sliding block located in another constraining position according to the second embodiment of the present invention.
Figure 13:
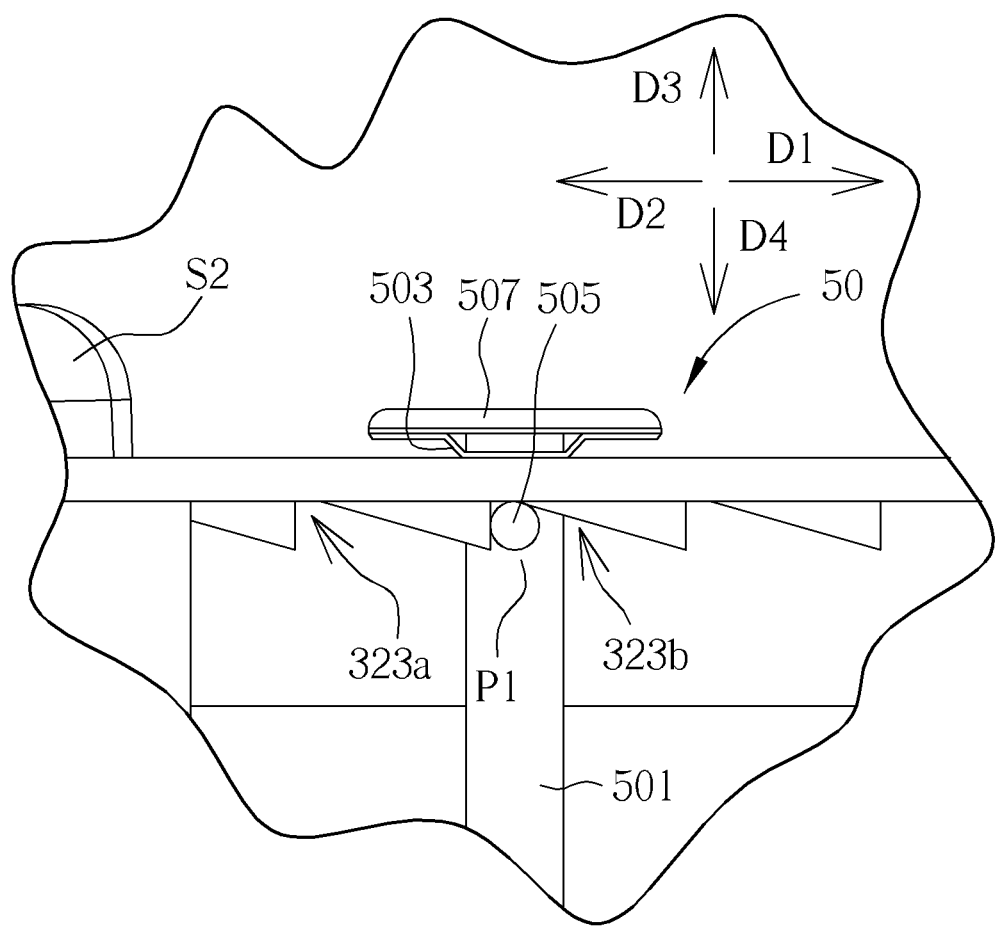
FIG. 13 is a partly enlarged view of the sliding block shown in FIG. 12.

Please refer to FIG. 11 to FIG. 13. FIG. 12 is a cross-sectional view of the sliding block 40 located in another constraining position according to the second embodiment of the present invention. FIG. 13 is a partly enlarged view of the sliding block 40 shown in FIG. 12. As shown in FIG. 11 to FIG. 13, when the second side S2 of the keyboard 36 is desired to be adjusted, the pressing structure 507 of the constraining member 50 of the keyboard lift mechanism 38' is pressed, such that the pressing structure 507 drives the main body 501 of the constraining member 50 to move in a fourth direction D4 opposite to the third direction D3. In the meanwhile, the engaging structure 505 on the main body 501 can separate from the constraining slot 323a, and the resilient structure 503 is in a compressed status. Then, the pressing structure 507 is moved in the first direction D1 or in the second direction D2. For example, the pressing structure 507 shown in FIG. 11 can be moved in the first direction D1. When the engaging structure 505 on the main body 501 is moved to the corresponding constraining slot 323b, the pressing structure 507 is released. The resilient structure 503 drives the main body 501 of the constraining member 50 to recover in the third direction D3, such that the engaging structure 505 of the constraining member 50 engages with the constraining slot 323b of the lower casing 32, as shown in FIG. 13. In the meanwhile, the second end P2 of the main body 501 of the constraining member 50 can stop the sliding body 401 of the sliding member 40 in the constraining position, as shown in FIG. 12. In such a manner, the constraining member 50 can constrain the sliding distance of the sliding block 40, so as to change the lift height of the second side S2 of the keyboard 36.

In practical application, the resilient structure 503 and the engaging structure 505 of the constraining member 50 can be integrally formed on the main body 501 of the constraining member 50. In this embodiment, the constraining slots 323 of the lower casing 32 can be substantially a saw-shaped structure, respectively. It should be noticed that structures of the constraining slots 323 are not limited to that mentioned above. For example, the constraining slot 323 can be substantially a battlemented structure. In other words, structures capable of fixing the engaging structure 505 of the constraining member 50 are within the scope of the present invention.

Figure 14:
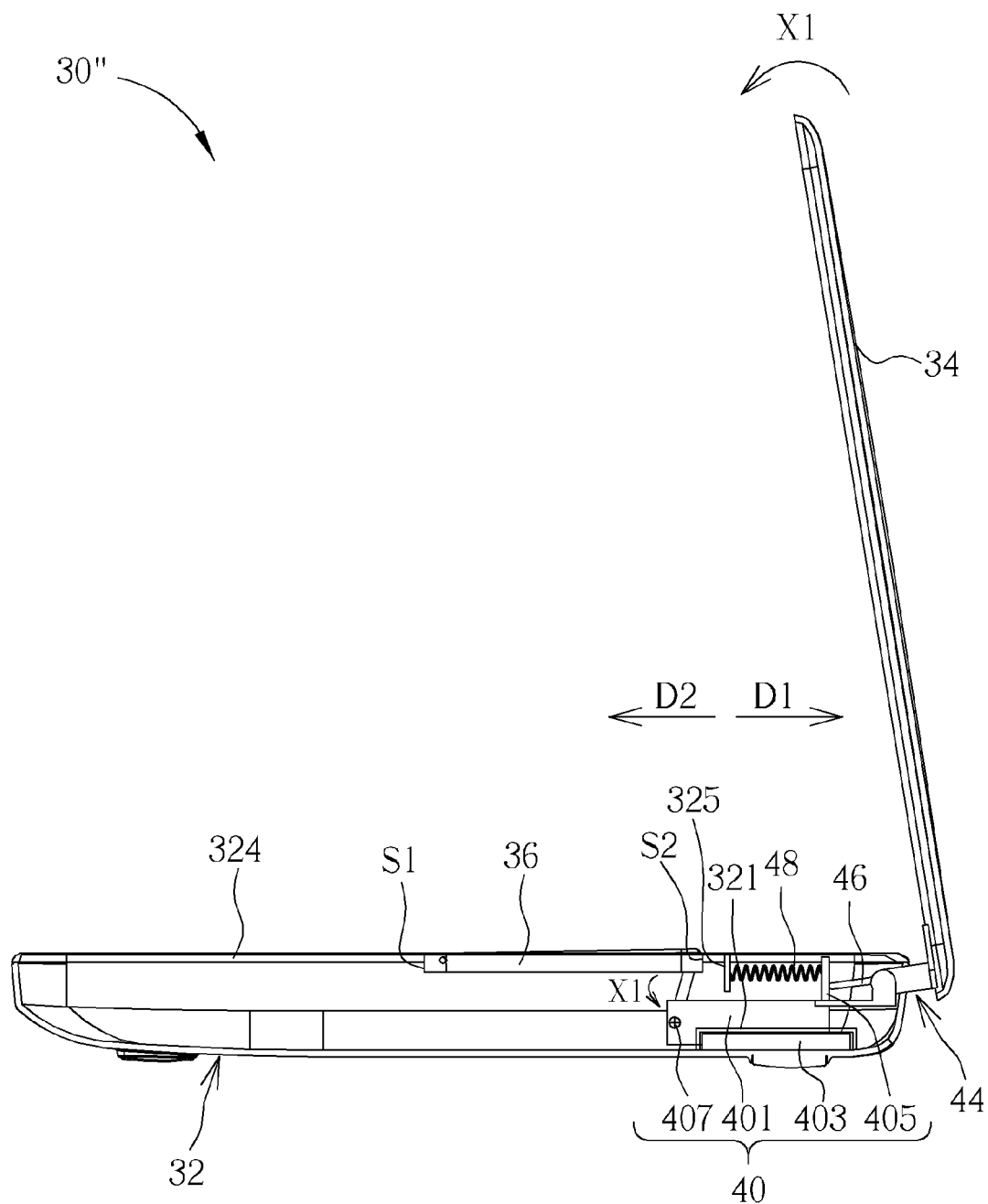
FIG. 14 is a cross-sectional view of a portable electronic device in an opening status according to a third embodiment of the present invention.
Figure 15:
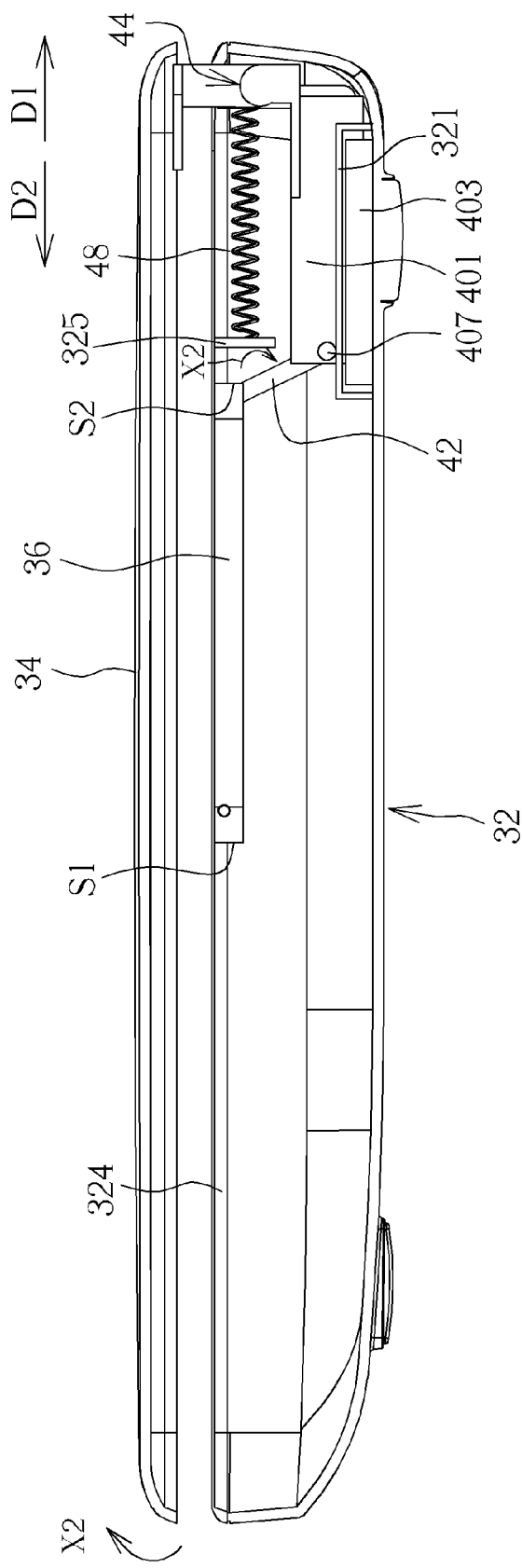
FIG. 15 is a cross-sectional view of the portable electronic device in a containing status according to the third embodiment of the present invention.

Please refer to FIG. 14 and FIG. 15. FIG. 14 is a cross-sectional view of a portable electronic device 30" in an opening status according to a third embodiment of the present invention. FIG. 15 is a cross-sectional view of the portable electronic device 30" in a containing status according to the third embodiment of the present invention. As shown in FIG. 14 and FIG. 6, main difference between the portable electronic device 30" and the aforesaid portable electronic device 30 is the disposal of the resilient member 48. The lower casing 32 of the portable electronic device 30" further includes a housing body 324 and a supporting wall 325. The supporting wall 325 is disposed on the housing body 324 and located in a position between the second side S2 of the keyboard 36 and the driving portion 405 of the sliding block 40. In addition, the resilient member 48 of the portable electronic device 30" abuts against the driving portion 405 of the sliding block 40 and the supporting wall 325 of the lower casing 32. In other words, an end of the resilient member 48 abuts against the driving portion 405 of the sliding block 40, and another end of the resilient member 48 abuts against the supporting wall 325 of the lower casing 32 of the portable electronic device 30". Accordingly, when sliding body 401 of the sliding block 40 slides relative to the lower casing 32, the driving portion 405 of the sliding block 40 can compress or release the resilient member 48 cooperative with the supporting wall 325 of the lower casing 32, so as to generate the corresponding resilient force of the resilient member 48. In addition, the driving member 46 of the portable electronic device 30" is connected to the hinge assembly 44 and is capable of rotating with the upper casing 34. Furthermore, the driving member 46 abuts against the driving portion 405 of the sliding block 40 all the time.

More detailed description for principle of the keyboard lift mechanism 38" is provided as follows. As shown in FIG. 14 to FIG. 15, when the portable electronic device 30" is desired to be contained, the upper casing 34 of the portable electronic device 30" is rotated in the first rotating direction X1, i.e. the counterclockwise direction as shown in FIG. 14, from a position shown in FIG. 14, such that the driving member 46 gradually separates from the driving portion 405 of the sliding block 40. In the meanwhile, the resilient member 48 releases the resilient energy for generating the resilient force, so as to push the driving portion 405. Accordingly, the sliding body 401 is driven to move in the first direction D1. In such a manner, the pivoting portion 407 of the sliding block 40 can drive the link bar 42 to rotate, so as to drive the keyboard 36 to rotate toward a containing position shown in FIG. 15 until the keyboard 36 is located in the containing position shown in FIG. 15. In the meanwhile, the upper casing 34 of the portable electronic device 30" is closed relative to the lower casing 32 for a user to contain or carry easily. In addition, when the sliding body 401 moves in the first direction D1, the driving portion 405 of the sliding block 40 releases the resilient member 48 cooperatively with the supporting wall 325 of the lower casing 32, such that the resilient member 48 releases the resilient energy for generating the resilient force during the above-mentioned process.

When the portable electronic device 30" is desired to be opened, the upper casing 34 of the portable electronic device 30" is rotated in the second rotating direction X2, i.e. the clockwise direction as shown in FIG. 15, from the position shown in FIG. 15, such that the driving member 46 pushes the driving portion 405 of the sliding block 40. Accordingly, the sliding body 401 moves in the second direction D2 opposite to the first direction D1. In such a manner, the pivoting portion 407 of the sliding body 401 drives the link bar 42 to rotate, so as to drive the keyboard 36 to rotate to the opening position as shown in FIG. 14. In the meanwhile, the upper casing 34 of the keyboard lift mechanism 38" can be opened relative to the lower casing 32, such that the user can operate the keyboard 36 in the opening position. It should be noticed that the driving portion 405 of the sliding block 40 compresses the resilient member 48 cooperatively with the supporting wall 325 of the lower casing 32 when the sliding body 401 slides in the second direction D2. Accordingly, the resilient member 48 can store the resilient energy during the above-mentioned process. It should be noticed that the keyboard lift mechanism 38" can further include the constraining member 50. Since the structure and the principle of the constraining member 50 is identical to the one adapted to the keyboard lift mechanism 38', detailed description is omitted herein for simplicity.

In summary, the present invention utilizes cooperation of the driving member, the sliding block, the resilient member and the link bar to make the keyboard lift and descend between the containing position and the opening position when the upper casing of the portable electronic device is rotated. Accordingly, the present invention can save mechanical space due to simpler mechanism and increase competitive advantage for the portable electronic device to meet demands for smaller size. Furthermore, the present invention can utilize the engaging structure on the constraining member to engage with one of the plurality of constraining slots on the lower casing of the portable electronic device, such that the constraining member stops the sliding block in the corresponding constraining slot. The aforesaid constraining member can constrain the sliding distance of the sliding block, so as to constrain the rotating angle of the link bar. Accordingly, the lift height of the second side of the keyboard can be adjusted. In such a manner, the keyboard lift mechanism of the present invention can adjust an angle between the keyboard and the lower casing of the portable electronic device according to the user's preference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard lift mechanism adapted to a keyboard of a portable electronic device, the portable electronic device comprising an upper casing and a lower casing, a first side of the keyboard being pivoted to the lower casing, the keyboard lift mechanism comprising:
   a sliding block slidably disposed inside the lower casing;
   a link bar with both ends being respectively pivoted to a second side of the keyboard and the sliding block;
   a hinge assembly for pivoting the upper casing and the lower casing;
   a driving member connected to the hinge assembly;
   a resilient member abutting against the lower casing and the sliding block, the resilient member and the driving member driving the sliding block to move in a first direction when the upper casing rotates in a first rotating direction, such that the link bar is rotated to drive the keyboard to a containing position, and the resilient member and the driving member driving the sliding block to move in a second direction opposite to the first direction when the upper casing rotates in a second rotating direction opposite to the first direction, such that the link bar is rotated to drive the keyboard to an opening position; and
   a constraining member movably disposed inside the lower casing, the constraining member comprising:
      a main body;
      a resilient structure disposed on the main body and abutting against the lower casing for providing a resilient force in a third direction, so as to drive the main body to recover; and
      an engaging structure disposed on the main body for engaging with a constraining slot of the lower casing when the resilient structure drives the main body to recover, such that an end of the main body stops the sliding block in a constraining position.

2. The keyboard lift mechanism of claim 1, wherein the sliding block comprises:
   a sliding body;
   a sliding portion connected to a bottom of the sliding body and disposed in a sliding slot of the lower casing, such that the sliding body is slidably disposed inside the lower casing;
   a driving portion connected to a side of the sliding body corresponding to the driving member and abutting against the resilient member, the driving member pushing the driving portion when the upper casing rotates in the first rotating direction, so as to drive the sliding body to move in the first direction, the resilient member pushing the driving portion when the upper casing rotates in the second rotating direction, so as to drive the sliding body to move in the second direction; and
a pivoting portion disposed on another side of the sliding body opposite to the driving portion for pivoting to the link bar.

3. The keyboard lift mechanism of claim 2, wherein the resilient member abuts against a supporting wall of the lower casing which is located in a position between the keyboard and the driving portion of the sliding block, the resilient member and the driving member drive the keyboard to rotate to the containing position when the upper casing rotates in the first rotating direction, and the resilient member and the driving member drive the keyboard to rotate to the opening position when the upper casing rotates in the second rotating direction.

4. The keyboard lift mechanism of claim 2, wherein the resilient member abuts against an inner wall of the lower casing and the driving portion of the sliding block, the resilient member and the driving member drive the keyboard to rotate to the containing position when the upper casing rotates in the first rotating direction, and the resilient member and the driving member drive the keyboard to rotate to the opening position when the upper casing rotates in the second rotating direction.

5. The keyboard lift mechanism of claim 1, wherein the constraining member further comprises:
a pressing structure disposed on another end of the main body and connected to the resilient structure for driving the main body to move in a fourth direction opposite to the third direction, so as to separate the engaging structure from the constraining slot.

6. The keyboard lift mechanism of claim 1, wherein the resilient structure and the engaging structure are integrally formed on the main body.

7. The keyboard lift mechanism of claim 1, wherein the resilient member is a spring.

8. The keyboard lift mechanism of claim 1, wherein the link bar rotates in the first rotating direction when the resilient member and the driving member drive the sliding block to move in the first direction, and the link bar rotates in the second rotating direction when the resilient member and the driving member drive the sliding block to move in the second direction.

9. A portable electronic device, comprising:
a lower casing comprising a plurality of constraining slots;
an upper casing pivoted to the lower casing;
a keyboard disposed on the lower casing, a first side of the keyboard being pivoted to the lower casing; and
a keyboard lift mechanism for lifting and descending the keyboard, the keyboard lift mechanism comprising:
a sliding block slidably disposed inside the lower casing;
a link bar with both ends being respectively pivoted to a second side of the keyboard and the sliding block;
a hinge assembly for pivoting the upper casing and the lower casing;
a driving member connected to the hinge assembly;
a resilient member abutting against the lower casing and the sliding block, the resilient member and the driving member driving the sliding block to move in a first direction when the upper casing rotates in a first rotating direction, such that the link bar is rotated to drive the keyboard to a containing position, and the resilient member and the driving member driving the sliding block to move in a second direction opposite to the first direction when the upper casing rotates in a second rotating direction opposite to the first direction, such that the link bar is rotated to drive the keyboard to an opening position; and
a constraining member movably disposed inside the lower casing, the constraining member comprising:
a main body;
a resilient structure disposed on the main body and abutting against the lower casing for providing a resilient force in a third direction, so as to drive the main body to recover; and
an engaging structure disposed on the main body for engaging with one of the plurality of constraining slots of the lower casing when the resilient structure drives the main body to recover, such that an end of the main body stops the sliding block in a constraining position.

10. The portable electronic device of claim 9, wherein the lower casing comprises a sliding slot disposed in a position corresponding to the sliding block, and the sliding block comprises:
a sliding body;
a sliding portion connected to a bottom of the sliding body and disposed in a sliding slot of the lower casing, such that the sliding body is slidably disposed inside the lower casing;
a driving portion connected to a side of the sliding body corresponding to the driving member and abutting against the resilient member, the driving member pushing the driving portion when the upper casing rotates in the first rotating direction, so as to drive the sliding body to move in the first direction, the resilient member pushing the driving portion when the upper casing rotates in the second rotating direction, so as to drive the sliding body to move in the second direction; and
a pivoting portion disposed on another side of the sliding body opposite to the driving portion for pivoting to the link bar.

11. The portable electronic device of claim 10, wherein the lower casing further comprises:
a housing body; and
a supporting wall disposed on the housing body and located in a position between the keyboard and the driving portion of the sliding block, the resilient member abutting against the supporting wall and the driving portion of the sliding block, the resilient member and the driving member drive the keyboard to rotate to the containing position when the upper casing rotates in the first rotating direction, and the resilient member and the driving member drive the keyboard to rotate to the opening position when the upper casing rotates in the second rotating direction.

12. The portable electronic device of claim 10, wherein the lower casing comprises an inner wall, the resilient member abuts against the inner wall and the driving portion of the sliding block, the resilient member and the driving member drive the keyboard to rotate to the containing position when the upper casing rotates in the first rotating direction, and the resilient member and the driving member drive the keyboard to rotate to the opening position when the upper casing rotates in the second rotating direction.

13. The portable electronic device of claim 9, wherein the constraining member further comprises:
a pressing structure disposed on another end of the main body and connected to the resilient structure for driving the main body to move in a fourth direction opposite to the third direction, so as to separate the engaging structure from the constraining slot.

14. The portable electronic device of claim 9, wherein the plurality of constraining slots are substantially a saw-shaped structure or a battlemented structure, respectively.

15. The portable electronic device of claim 9, wherein the resilient structure and the engaging structure are integrally formed on the main body.

16. The portable electronic device of claim 9, wherein the resilient member is a spring.

17. The portable electronic device of claim 9, wherein the link bar rotates in the first rotating direction when the resilient member and the driving member drive the sliding block to move in the first direction, and the link bar rotates in the second rotating direction when the resilient member and the driving member drive the sliding block to move in the second direction.

* * * * *